United States Patent
Kim

(10) Patent No.: US 9,575,225 B2
(45) Date of Patent: Feb. 21, 2017

(54) STEP PRISMATIC RETRO-REFLECTOR WITH IMPROVED WIDE-ANGLE PERFORMANCE

(71) Applicant: Hyeonsik Kim, Seoul (KR)

(72) Inventor: Hyeonsik Kim, Seoul (KR)

(*) Notice: Subject to any disclaimer, the term of this patent is extended or adjusted under 35 U.S.C. 154(b) by 0 days.

(21) Appl. No.: 15/024,113

(22) PCT Filed: Sep. 23, 2014

(86) PCT No.: PCT/KR2014/008847
§ 371 (c)(1),
(2) Date: Mar. 23, 2016

(87) PCT Pub. No.: WO2015/041503
PCT Pub. Date: Mar. 26, 2015

(65) Prior Publication Data
US 2016/0231476 A1    Aug. 11, 2016

(30) Foreign Application Priority Data
Sep. 23, 2013 (KR) .................. 10-2013-0112922

(51) Int. Cl.
G02B 5/136 (2006.01)
G02B 5/12 (2006.01)

(52) U.S. Cl.
CPC ............ *G02B 5/136* (2013.01); *G02B 5/12* (2013.01)

(58) Field of Classification Search
CPC ........... G02B 5/12; G02B 5/136; G02B 5/122; G02B 5/124
USPC ................. 359/529–530, 546, 834, 836
See application file for complete search history.

(56) References Cited

U.S. PATENT DOCUMENTS
5,889,615 A   3/1999   Dreyer et al.

FOREIGN PATENT DOCUMENTS
| JP | 2001188114 A | 7/2001 |
| KR | 20010027203 A | 4/2001 |
| KR | 20060085605 A | 7/2006 |
| KR | 20100079855 A | 7/2010 |

*Primary Examiner* — James Phan
(74) *Attorney, Agent, or Firm* — Taft Stettinius & Hollister LLP; Stephen F. Rost

(57) ABSTRACT

A step prismatic retro-reflector includes a main reflective corner having a shared reflective surface of a geometric single plane, a virtual step surface coming into contact with the shared reflective surface at a right angle, and a plurality of sub reflective corners. Each reflective corner has a pair of independent reflective surfaces coming into contact with each other at a right angle, and arranged along the step surface, wherein the retro-reflector elements are arranged to be alternated such that a corner ratio (l/w) of the sub reflective corners is 1.5 or more, a corner orientation of the main reflective corner deviates at an angle of 10 degrees or more with respect to a point of tangency of an incident plane, a reflection orientation thereof deviates at an angle within 10 degrees, and the corner orientations thereof deviate in the opposite direction to each other.

5 Claims, 7 Drawing Sheets

US 9,575,225 B2

STEP PRISMATIC RETRO-REFLECTOR WITH IMPROVED WIDE-ANGLE PERFORMANCE

RELATED APPLICATIONS

This application is a U.S. National Stage Application under 35 U.S.C. §371 of PCT International Application Serial No. PCT/KR2014/008847, which has an international filing date of Sep. 23, 2014, designates the United States of America, which claims priority to Korean Patent Application No. 10-2013-0112922, filed Sep. 23, 2013, the disclosures of both of which are hereby expressly incorporated by reference in their entirety.

FIELD OF THE DISCLOSURE

The present disclosure relates to a step prismatic retro-reflector capable of retro-reflecting incident light toward a light source by using a retro-reflective structure combined with reflective corners, and more particularly, to a step prismatic retro-reflector with both improved retro-reflection efficiency and improved wide-angle performance.

BACKGROUND

Retro-reflectors are installed or attached to various types of traffic safety facilities such as various types of traffic signs, pavement markers, delineators, and traffic tripods, or items such as safety clothing, automobiles, bicycles, hats, and shoes, of which the visibility needs to be ensured at night, and the retro-reflectors may improve visibility of these items by retro-reflecting incident light, which enters from a front side, toward a light source that emits the light.

As the retro-reflectors applied to these items in the related art, retro-reflectors provided with glass beads or cube corners have been often used. Since the retro-reflectors in the related art have different retro-reflection characteristics varying depending on incident angles of incident light, the retro-reflectors have advantages and disadvantages.

For example, retro-reflection efficiency of the retro-reflector using the glass beads is uniform regardless of incident angles, but the retro-reflector using the glass beads has problems in that retro-reflection efficiency is low overall, and a reflection function deteriorates in a case in which water is attached to the surface of the retro-reflector.

Further, the retro-reflector using the cube corners in the related art has high retro-reflectivity for light having a small incident angle, that is, front light, but rapidly degrades brightness for lateral light having a large incident angle, such that a range of incident angles within which retro-reflection is enabled, that is, retro-reflection visibility is very narrow. Moreover, it is very difficult to design and change a direction of retro-reflection visibility in order to mainly retro-reflect light having a large incident angle.

To solve the problems, the present applicant has developed 'Retro-Reflection Unit and Retro-Reflector (Korean Patent Application No. 10-2006-7038)' which have a complex total-reflection prismatic retro-reflective structure in which reflective surfaces, which are orthogonal to each other, are arranged, in a steplike manner, on a reflective surface of two reflective surfaces which are orthogonal to each other, such that overall retro-reflectivity is high, and particularly, a direction of a main reflection orientation, which is defined as an incident direction in which retro-reflectivity is highest, may be very easily changed without limitation on an angle with respect to a normal direction of an incident plane during a design process.

However, the retro-reflection unit of the retro-reflector includes two reflective surfaces (a shared reflective surface and a step portion), such that there is a problem in that retro-reflection is enabled only for incident light within a particular incident angle range, and thus a retro-reflection range is very narrow. For example, in a case in which the retro-reflector is developed for front light, very high retro-reflection efficiency is implemented for incident light having an incident angle of zero (0) degree, but in a case in which an incident angle becomes 10 degrees or more, the incident light penetrates the shared reflective surface such that a retro-reflection function of some retro-reflection units is degraded, and as a result, there is a problem in that retro-reflection performance is low for lateral light, and in a case in which the retro-reflector is developed for lateral light, there is a problem in that retro-reflection efficiency is very low for front light with compared to lateral light. Accordingly, since the retro-reflector of Korean Patent Application No. 10-2006-7038 has a very narrow reflection range, there is a problem in that applicability to front light or lateral light is restricted.

SUMMARY

The present disclosure has been made in an effort to solve the problems of the retro-reflector in the related art a step prismatic retro-reflector with improved wide-angle performance, which has very high retro-reflection efficiency in respect to front light, and significantly increases a retro-reflection range by enabling retro-reflection for incident light having a large incident angle without degrading a retro-reflection function for the incident light having a large incident angle.

A step prismatic retro-reflector with improved wide-angle performance according to the present disclosure has retro-reflector elements arranged thereon, the retro-reflector element including: a main reflective corner having a shared reflective surface of a geometric single plane, and a virtual step surface which is in contact with the shared reflective surface at a right angle; and a plurality of sub-reflective corners each having a pair of independent reflective surfaces which are in contact with each other at a right angle, and arranged along the step surface, in which a corner ratio l/w of the sub-reflective corners is 1.5 or more, a corner orientation of the main reflective corner is deflected at 10 degrees or more with respect to a normal line to an incident plane, a reflection orientation is deflected at a deflection angle of 10 degrees or less, and deflection directions of the corner orientations of the main reflective corners are arranged to be alternately staggered in opposite directions to each other.

In the aforementioned configuration, the corner ratio l/w of the sub-reflective corner may be 3 or more.

In addition, the deflection angle of the reflection orientation of each of the retro-reflector elements is within a range of 15 to 30 degrees.

The step prismatic retro-reflector with improved wide-angle performance according to the present disclosure, which is configured as described above, has very high retro-reflection efficiency in respect to front light. Further, the step prismatic retro-reflector particularly has effective retro-reflection efficiency at a predetermined level or higher even in respect to incident light having a large incident angle, and as a result, a range of incident angles is greatly increased, and thus a retro-reflection region within which retro-reflection is enabled is very wide.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taking in conjunction with the accompanying drawings, wherein.

DETAILED DESCRIPTION

Hereinafter, embodiments of the present disclosure will be described with reference to the accompanying drawings. These embodiments are provided so that those skilled in the art can sufficiently understand the present disclosure, but can be modified in various forms and the scope of the present disclosure is not limited to these embodiments.

Figure 1:
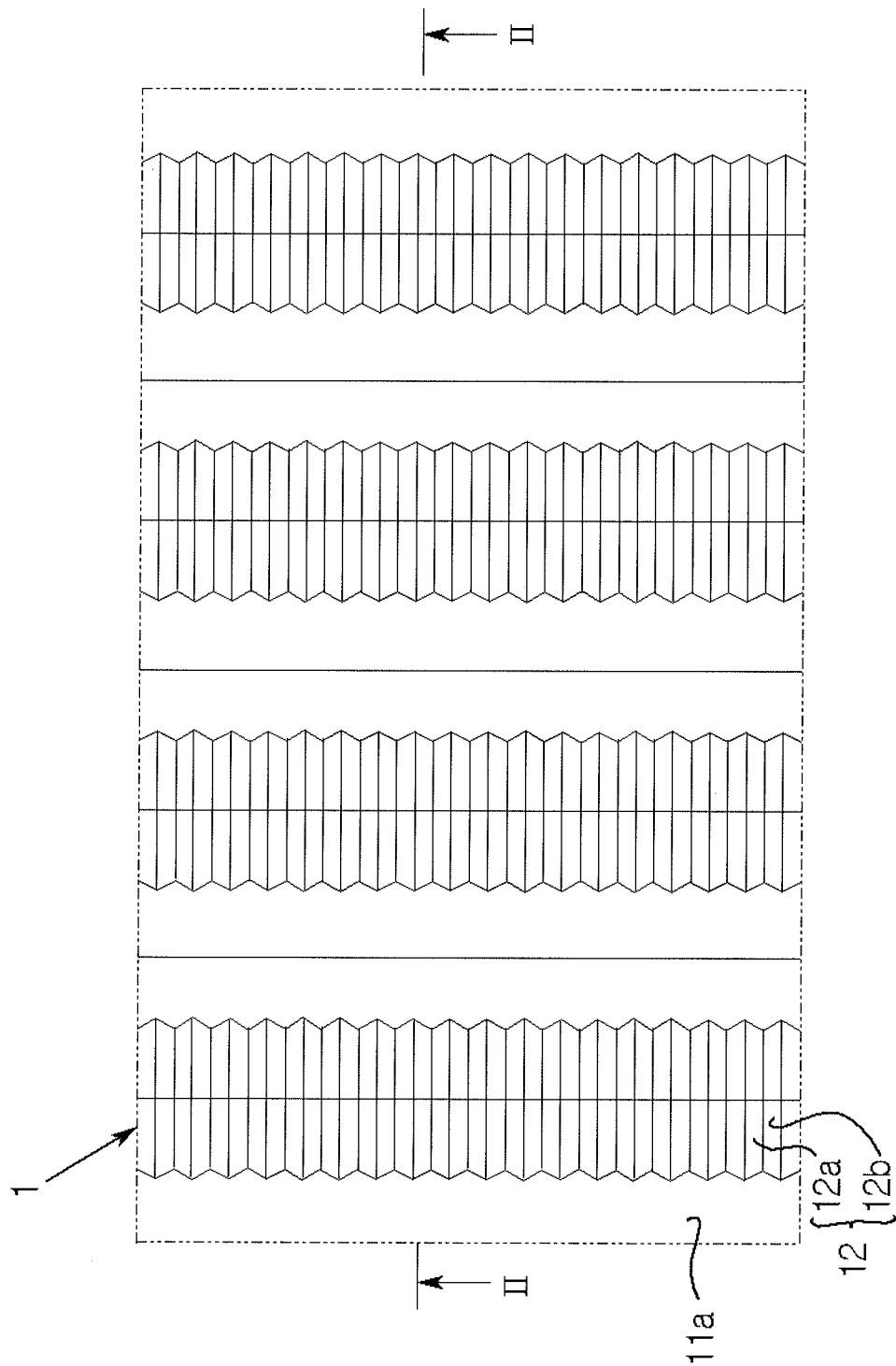
FIG. 1 is a front view of a step prismatic retro-reflector with improved wide-angle performance according to an exemplary embodiment of the present disclosure.
Figure 2A:
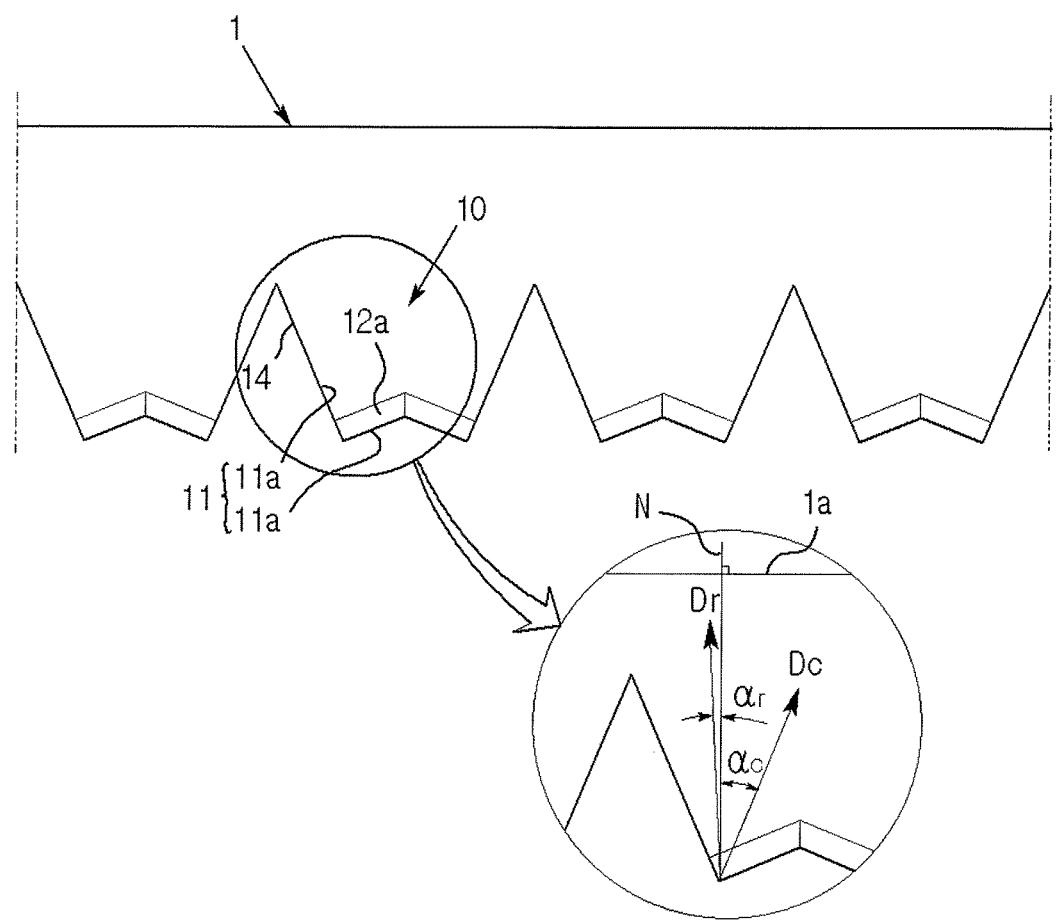
FIG. 2A is a cross-sectional view taken along line II-II of FIG. 1.

FIG. 1 is a front view of a step prismatic retro-reflector with improved wide-angle performance according to an exemplary embodiment of the present disclosure, and FIG. 2A is a cross-sectional view taken along line II-II of FIG. 1.

A step prismatic retro-reflector 1 with improved wide-angle performance according to the exemplary embodiment of the present disclosure is a plate-shaped retro-reflector manufactured by using a light transmissive material such as polycarbonate, ultraviolet ray curable resin, acrylic, or glass, and as illustrated, retro-reflector elements 10 are formed to be densely arranged in a predetermined pattern on a rear surface of the retro-reflector.

The retro-reflector element 10 of the retro-reflector refers to a retro-reflective structure as a smallest unit capable of retro-reflecting incident light, and in the step prismatic retro-reflector 1 with improved wide-angle performance according to the present disclosure, a main reflective corner 11 in the form of a total reflection prism is formed by a shared reflective surface 11a and a virtual step surface 11b which is in contact with the shared reflective surface 11a at a facial angle of 90 degrees, and sub-reflective corners 12, which are small reflective corners, are formed to be densely arranged on the step surface 11b, such that one step prismatic retro-reflector element 10 is formed by the sub-reflective corners 12 and the shared reflective surface 11a.

In one configuration, the rear surface of the step prismatic retro-reflector 1 according to the present disclosure may be coated with a reflecting film 14 by a process such as vapor deposition in order to improve reflectivity by blocking light transmission.

Figure 3:
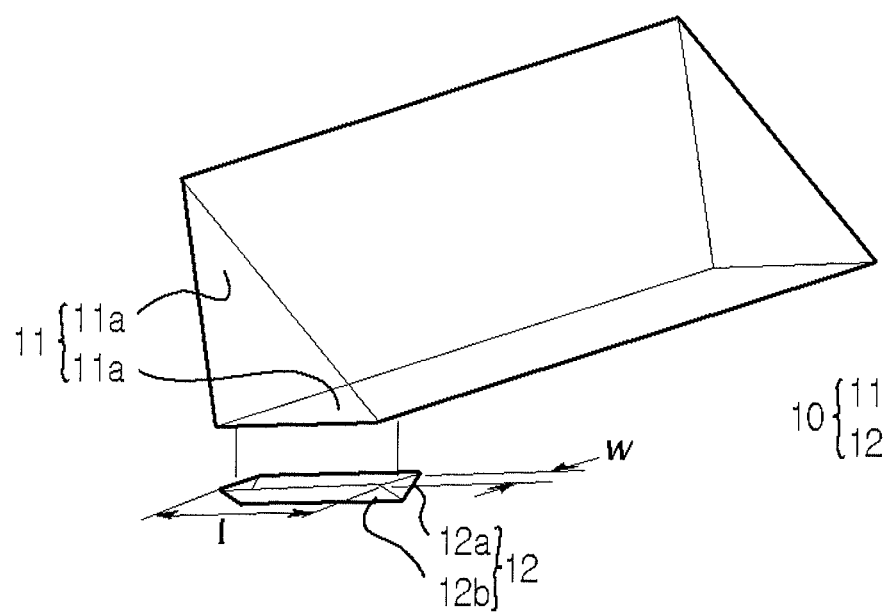
FIG. 3 is an exploded schematic view of a retro-reflector element of the step prismatic retro-reflector with improved wide-angle performance according to the present disclosure.
Figure 4:
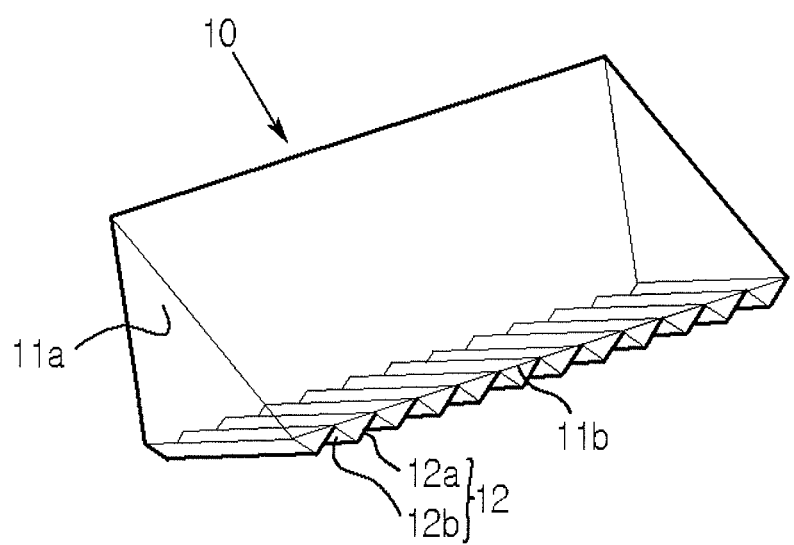
FIG. 4 is a perspective view of the retro-reflector element of the step prismatic retro-reflector with improved wide-angle performance according to the present disclosure.

FIGS. 3 and 4 illustrate the step prismatic retro-reflector element which has a retro-reflective structure as a smallest unit of the step prismatic retro-reflector with improved wide-angle performance according to the present disclosure.

As illustrated, the step prismatic retro-reflector element 10 defines a step prismatic retro-reflective structure, that is, a retro-reflective structure formed in a steplike manner on one surface (the step surface 11b) of a total reflection prism (right-angled prism) having two reflective surfaces (the shared reflective surface 11a and the step surface 11b) which are orthogonal to each other, and the main reflective corner 11 is formed by the shared reflective surface 11a and the step surface 11b which are in contact with each other at an angle of nearly 90 degrees, and the sub-reflective corner 12 is formed by neighboring independent reflective surfaces 12a and 12b, which are paired with each other, in the step surface 11b of the main reflective corner 11. Therefore, the independent reflective surfaces 12a and 12b, which define the sub-reflective corner 12 by being paired with each other, define, together with the shared reflective surface 11a, a set of retro-reflective structure as illustrated in FIG. 3, and as a result, the respective retro-reflector elements 10 retro-reflect incident light entering the elements 10.

For reference, the reflective corner refers to a reflective structure of a total reflection prism, that is, a reflective structure formed by the two reflective surfaces which are orthogonal to each other, and corresponds to the main reflective corner 11 and the sub-reflective corner 12 in the step prismatic retro-reflector with improved wide-angle performance according to the present disclosure. As illustrated in FIG. 3, the main reflective corner 11 is a reflective corner formed by the shared reflective surface 11a and the virtual step surface 11b which is in contact with the shared reflective surface 11a at a facial angle of 90 degrees, and the sub-reflective corner 12 is formed by the independent reflective surfaces 12a and 12b which are arranged to be in contact with each other at a facial angle of 90 degrees along the step surfaces 11b by pairing the independent reflective surfaces 12a and 12b which face to each other.

In the step prismatic retro-reflector with improved wide-angle performance according to the present disclosure, the sub-reflective corners 12 of the respective retro-reflector elements 10 have a corner ratio l/w of 1.5 or more. Further, the main reflective corner 11 has a corner orientation Dc which is deflected with respect to a normal line N to an incident plane 1a at 10 degrees or more, and a reflection orientation Dr which is deflected within a deflection angle of 10 degrees.

In the step prismatic retro-reflector with improved wide-angle performance, the corner ratio l/w of the sub-reflective corner 12 refers to an aspect ratio l/w of the reflective corner as illustrated in FIG. 3, and has a great effect on retro-reflection performance in respect to incident light having a large incident angle, and the retro-reflection efficiency in respect to incident light having a large incident angle is improved as the corner ratio l/w increases. Consequently, the corner ratio l/w of the sub-reflective corner is one design factor of the step prismatic retro-reflector which has a great effect on a reflection range within which retro-reflection may be carried out with effective reflection efficiency. In the case of the step prismatic retro-reflector with improved wide-angle performance according to the present disclosure, the corner ratio l/w of the sub-reflective corner may be set to 1.5 or more in order to ensure an increased reflection range, and in the present exemplary embodiment, the corner ratio l/w of the sub-reflective corner is set to 2.2.

Figure 5:
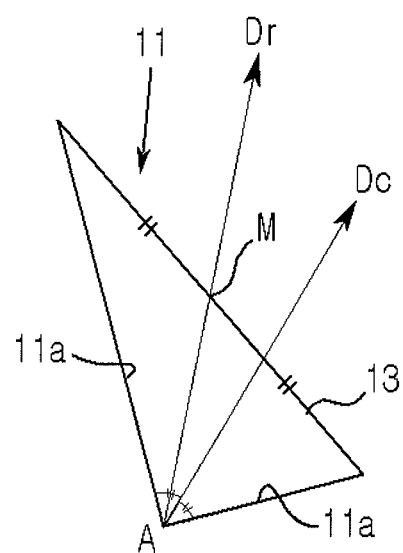
FIG. 5 is a transverse cross-sectional view of a reflective corner according to the present disclosure.

As illustrated in FIG. 5, the corner orientation Dc in the reflective corner 11 is defined as a direction in which the reflective corner 11 is geometrically arranged, that is, a direction of a bisector which bisects a vertical angle A of the corner which is a nearly right angle, and the corner orientation Dc is a factor for determining a direction and a reflection region in which the reflective corner 11 may corner-reflect light. That is, the reflective corner 11 may corner-reflect light entering the corner 11 at an incident angle within approximately 45 degrees in left and right directions based on the corner orientation Dc. In the case of the step prismatic retro-reflector element 10, the corner orientation Dc of the main reflective corner 11 determines a direction and a region in which the element 10 may retro-reflect light, thereby retro-reflecting light entering the main reflective corner 11 within a range within 45 degrees in the left and right directions of the corner orientation Dc of the main reflective corner 11.

The reflection orientation Dr of the reflective corner 11 refers to a direction in which incident light may be corner-reflected with maximum efficiency, and the reflection orientation Dr is defined as a direction of a median line, which connects a corner vertex A and a median point M of a large side 13 (a line that connects two opposite ends of the corner) in view of a transverse cross section of the reflective corner as illustrated in FIG. 5. Therefore, in a case in which two reflective surfaces 11a and 11b, which define the reflective corner 11, have different widths, the reflection orientation Dr is deflected toward a reflective surface having a greater width.

Figure 2B:
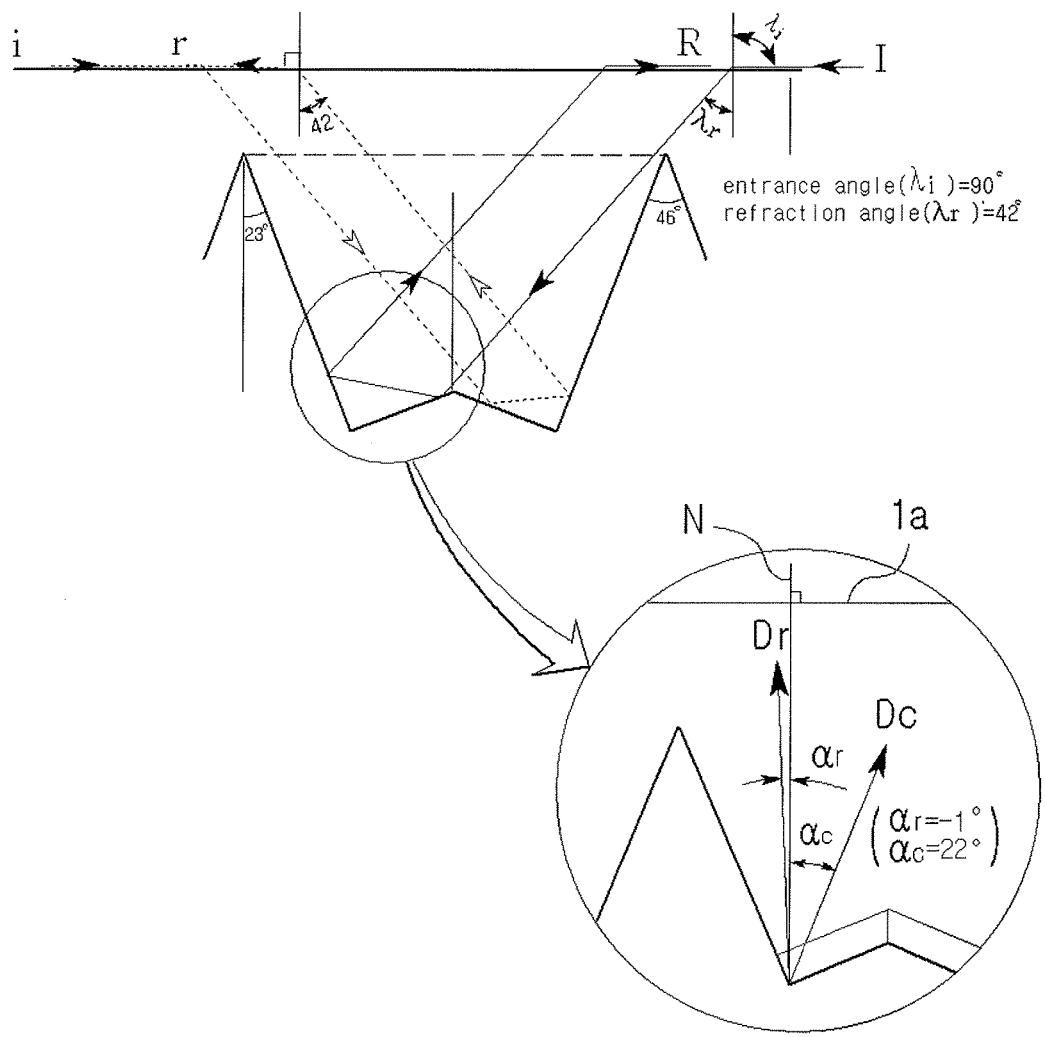
FIG. 2B is a reflection path view of FIG. 2A.

As illustrated in FIG. 2B, in the case of the step prismatic retro-reflector 1 with improved wide-angle performance according to the present exemplary embodiment, the corner orientations Dc of the main reflective corners 11 of the retro-reflector elements 10 which face each other are deflected with respect to the normal line N to the incident plane 1a at a deflection angle $\alpha_c$ of 22 degrees in the left and right directions, respectively, and the reflection orientation Dr is deflected at −1 degree, such that even lateral light of which the refraction angle $\lambda r$ at the incident plane 1a reaches maximum 42 degrees may be retro-reflected. Consequently, in a case in which a refractive index of a material is 1.5, even lateral light of which the incident angle $\lambda i$ reaches nearly 90 degrees may be retro-reflected.

Figure 2C:
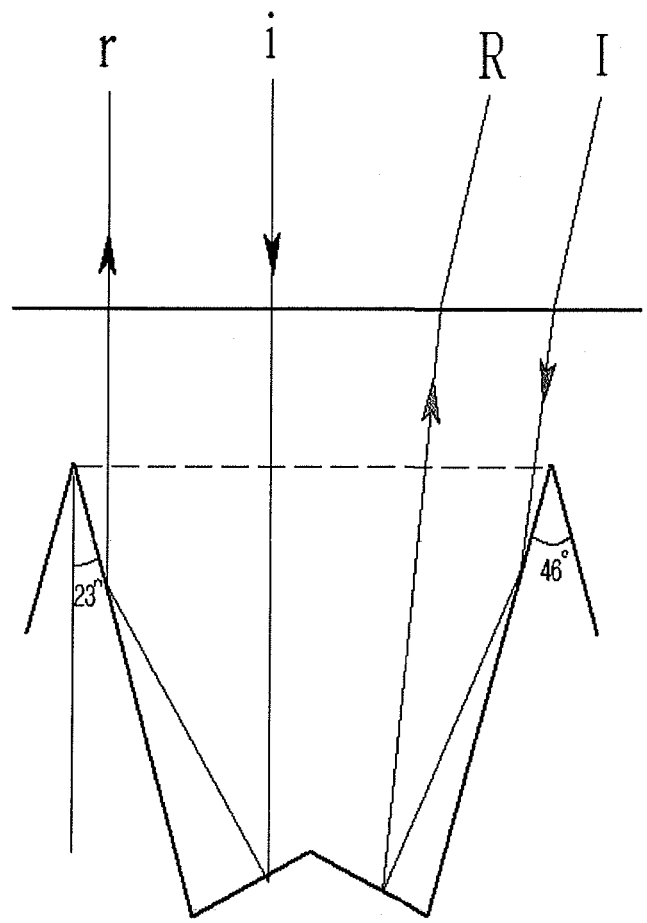
FIG. 2C is another reflection path view of FIG. 2A.

Moreover, as illustrated in FIG. 2C, in the case of the step prismatic retro-reflector 1 with improved wide-angle performance according to the present exemplary embodiment, the reflection orientation Dr of the main reflective corner 11 of the retro-reflector element 10 has a deflection angle $\alpha_r$ of about −1 degree with respect to the normal line N to the incident plane 1a, such that front light having an incident angle of 1 degree or less may be retro-reflected with highest efficiency.

For reference, the 90 degrees, which is mentioned as a facial angle between the respective reflective surfaces in the present exemplary embodiment, refers to an angle which is slightly greater or smaller, within a range of 1 degree or less, than an optical right angle at which the reflective corner is formed by the reflective surfaces, that is, geometric 90 degrees, and this is to retro-reflect incident light by diffusing the incident light in a conical shape. Therefore, the 90 degrees mentioned in the present specification needs to be interpreted as not being geometric 90 degrees, but as being optical 90 degrees, that is, 'nearly 90 degrees' which is greater or smaller than 90 degrees within a range of 1 degree or less.

According to the step prismatic retro-reflector with improved wide-angle performance according to the present disclosure, which is configured as described above, the reflection orientation Dr of the main reflective corner 11 is directed toward a front side, such that the entirety of the front light entering from the front side may be retro-reflected, when ignoring scattering caused by illumination intensity at the incident plane 1a or an optical loss caused by light transmittance of a material, and as a result, retro-reflection efficiency is very high. Moreover, the corner orientations Dc of the main reflective corners 11 are deflected at a predetermined angle or larger in opposite directions to each other, such that even lateral light, which is deflected at an incident angle of 60 degrees or more, may be retro-reflected, and a retro-reflection range is also wide.

While embodiments incorporating the principles of the present disclosure have been described herein, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A step prismatic retro-reflector with improved wide-angle performance, which has retro-reflector elements arranged thereon, the retro-reflector element comprising:
   a main reflective corner having a shared reflective surface of a geometric single plane, and a virtual step surface which is in contact with the shared reflective surface at a right angle; and
   a plurality of sub-reflective corners each having a pair of independent reflective surfaces which are in contact with each other at a right angle, and arranged along the step surface,
   wherein the retro-reflector elements are arranged such that a corner ratio l/w of each of the sub-reflective corners is 1.5 or more where l defines the length and w defines the width of the sub-reflective corners, a corner orientation Dc of each of the main reflective corners is deflected at 10 degrees or more with respect to a normal line N to an incident plane, a reflection orientation Dr is deflected at a deflection angle of 10 degrees or less, and deflection directions of the corner orientations Dc of the respective main reflective corners are alternately staggered in opposite directions to each other.

2. The step prismatic retro-reflector of claim 1, wherein the corner ratio l/w of the sub-reflective corner is 3 or more.

3. The step prismatic retro-reflector of claim 1, wherein a deflection angle $\alpha_r$ of the reflection orientation of the main reflective corner is 5 to 30 degrees.

4. The step prismatic retro-reflector of claim 1, wherein a deflection angle $\alpha_c$ of the corner orientation of the main reflective corner is 5 degrees or less.

5. The step prismatic retro-reflector of claim 1, wherein a reflecting film is formed on a rear surface of the retro-reflector element.

* * * * *